United States Patent
Nagasawa et al.

[11] Patent Number: 5,898,285
[45] Date of Patent: Apr. 27, 1999

[54] METHOD OF TEACHING WELDING ROBOT

[75] Inventors: Toshiaki Nagasawa; Nobuo Kobayashi; Hisaya Ohiwa, all of Saitama-ken; Mitsugu Kaneko, Gunma-ken; Isao Bundou, Saitama-ken, all of Japan

[73] Assignee: Honda Giken Kogyo Kabushiki Kaisha, Tokyo, Japan

[21] Appl. No.: 09/028,774

[22] Filed: Feb. 24, 1998

[30] Foreign Application Priority Data

Mar. 11, 1997 [JP] Japan ..................... 9-056407
Mar. 11, 1997 [JP] Japan ..................... 7-056408

[51] Int. Cl.$^6$ .................................. B23K 11/11
[52] U.S. Cl. .............. 318/568.13; 318/568.14; 901/42; 219/86.7
[58] Field of Search ............... 318/568.1, 568.11, 318/568.13, 568.14, 574, 576; 219/86.1, 86.7; 414/5; 901/42

[56] References Cited

U.S. PATENT DOCUMENTS 4,447,697  5/1984  Dunne et al. .
5,340,960  8/1994  Takasaki et al. .
5,449,875  9/1995  Ito et al. .

FOREIGN PATENT DOCUMENTS

6-328267  11/1994  Japan .
2280135   1/1995   United Kingdom .

*Primary Examiner*—Bentsu Ro
*Attorney, Agent, or Firm*—Armstrong, Westerman, Hattori, McLeland & Naughton

[57] ABSTRACT

A welding robot has a gun main body, a stationary electrode tip which is immovable relative to the gun main body, and a movable electrode tip which is mounted on the gun main body and is opened and closed by a pressing source. The gun main body is movable by a driving source in a direction in which both the electrode tips lie opposite to each other. In teaching the welding robot by the movement thereof to each weld spot position of a workpiece, the movable electrode tip is moved in a closing direction relative to the gun main body by the pressing source in a state in which the gun main body is kept stationary at a predetermined position relative to the gun support bracket. The stationary electrode tip is moved in the closing direction by a relative movement of the gun main body relative to the movable electrode tip after the movable electrode tip has come into contact with the workpiece. A position at which the stationary electrode tip contacted the workpiece is detected. This position is stored as teaching data.

5 Claims, 7 Drawing Sheets

METHOD OF TEACHING WELDING ROBOT

BACKGROUND OF THE INVENTION

1. Field of the Invention

The present invention relates to a method of teaching a welding robot which is provided at its operating end with a spot welding gun.

2. Description of the Related Art

As a spot welding gun, there has hitherto been known one as disclosed in Japanese Published Unexamined Patent Application No. 328267/1994. Namely, on a gun main body there are provided a stationary electrode tip which is immovable relative to the gun main body, and a movable electrode tip which is operated for opening and closing by a pressing source (or a source for applying an electrode force) relative to the stationary electrode tip. The gun main body is arranged to be movable relative to a gun support bracket, by means of a driving source, in a direction in which both the electrode tips look toward each other (or lies opposite to each other).

This kind of spot welding gun is attached to an operating end of a welding robot by means of the gun support bracket. In performing the teaching of the welding robot, the following steps are taken. Namely, the spot welding gun is sequentially moved by manual operation to each of the weld spot positions of a workpiece. At each of the spot positions, the movable electrode tip is moved by the pressing source in a direction of closing the movable electrode tip. The stationary electrode tip is also moved by the movement of the driving source in a direction of closing it, whereby the workpiece is pinched between both the electrode tips. When this pinching point has coincided with an ordinary weld spot position of the workpiece, the positional data of each of the axes of the welding robot are stored as teaching data of that particular weld spot position.

The above-described spot welding gun can obtain an equalizing function by the movement of the gun main body by means of the driving source and, as long as the workpiece is inserted between both the electrode tips in a state in which the spot welding gun is opened, welding can be performed by pressing (or applying an electrode force to) the workpiece when the spot welding gun is closed. Therefore, in the conventional teaching, the position of the spot welding gun in the direction of pressing the workpiece is considered to be acceptable as long as the workpiece is inserted between both the electrode tips in a state in which the spot welding gun is open. The position thereof is thus not particularly monitored.

In the actual welding work, in order to shorten the time required for closing the spot welding gun, and also to prevent the workpiece from being deformed due to the striking by the electrode tips, it is desired to close each of the electrode tips at a relatively high speed until they approach the workpiece to a certain degree and, thereafter, close them at a low speed.

In the above-described conventional teaching method, however, at the time of operating the welding robot, the following may occur. Namely, even though the workpiece is inserted into the space between both the electrode tips which are in an open state, the workpiece may deviate toward one of the electrode tips. The electrode tips may therefore come into contact with the workpiece during the above-described high-speed movements of the electrode tips, resulting in a deformation of the workpiece.

In order to eliminate this kind of disadvantage, it becomes necessary to take measures such as to change the position for switching the speeds of movement of the electrode tips depending on the position of the workpiece or to amend the position, in the direction of pressing, of the spot welding gun relative to the workpiece.

In view of the above-described points, the present invention has an object of providing a method of teaching a welding robot in which a detection is made at the time of teaching as to in which position between both the electrode tips the workpiece is present, and the detected position is stored as the teaching data so that the above-described measures can be taken.

SUMMARY OF THE INVENTION

In order to attain the above and other objects, according to the first aspect of the present invention, there is provided a method of teaching a welding robot, the welding robot comprising a spot welding gun which is mounted via a gun support bracket on an operating end of the welding robot, the spot welding gun comprising: a gun main body; a stationary electrode tip which is mounted on the gun main body so as to be immovable relative thereto; a movable electrode tip which is mounted on the gun main body and is operated to open and close by a pressing source, the gun main body being movable by a driving source relative to the gun support bracket in a direction in which both the electrode tips lie opposite to each other. The method comprises the steps of: in teaching the spot welding gun by the movement thereof to each weld spot position of a workpiece, moving the movable electrode tip at each of the weld spot position in a closing direction relative to the gun main body by the pressing source in a state in which the gun main body is kept stationary at a predetermined position relative to the gun support bracket, and moving the stationary electrode tip in a closing direction by a relative movement of the gun main body relative to the movable electrode tip after the movable electrode tip has come into contact with the workpiece; detecting a position at which the stationary electrode tip contacted the workpiece; and storing the position as teaching data.

According to the above-described first aspect of the present invention, it is possible to detect, at the time of teaching, which particular position between the stationary electrode tip and the movable electrode tip the workpiece is located. Based on these positional data, it is possible to take the measures such as to change the position of switching the speed of each of the electrode tips or to amend the position of the spot welding gun, to thereby well perform the welding of the workpiece.

When the movable electrode tip is moved in the closing direction relative to the gun main body, it is preferable to hold a driving force of the driving source to a value which is both necessary and sufficient to support a weight of the gun main body. Then, until the movable electrode tip comes into contact with the workpiece, the driving source is restrained by the balance between the driving force of the driving source and the driving load by the weight of the gun main body. When the movable electrode tip has come into contact with the workpiece, the driving load is reduced by the contact reaction force and the restraining of the driving source is released. The gun main body thus moves relative to the gun support bracket at a speed which is equal to the relative speed of movement of the movable electrode tip by the pressing source relative to the gun main body, and the stationary electrode tip moves in the closing direction. At this time, since the weight of the gun main body is supported by the driving force of the driving source, the weight of the gun main body will not operate on the workpiece via the movable electrode tip. In addition, the electrode force which operates on the workpiece by the pressing source via the movable electrode tip also remains to be a small value until the stationary electrode tip comes into contact with the workpiece. The deflection of the workpiece therefore does not occur. It follows that the position of contact of the stationary electrode tip with the workpiece does not vary by the deflection of the workpiece and, consequently, the position of the workpiece can be accurately detected.

According to the second aspect of the present invention, there is provided a method of teaching a welding robot, the welding robot comprising a spot welding gun which is mounted via a gun support bracket on an operating end of the welding robot, the spot welding gun comprising: a gun main body; a stationary electrode tip which is mounted on the gun main body so as to be immovable relative thereto; a movable electrode tip which is mounted on the gun main body and is operated to open and close by a pressing source, the gun main body being movable by a driving source relative to the gun support bracket in a direction in which both the electrode tips lie opposite to each other. The method comprises the steps of: in teaching the spot welding gun by the movement thereof to each weld spot position of a workpiece, moving the stationary electrode tip at each of the weld spot position, at a predetermined set speed, by the movement of the gun main body by means of the driving source in a closing direction in which the stationary electrode tip approaches the workpiece, and moving the movable electrode tip, at a relative speed which is equal to the set speed, relative to the gun main body by the pressing source in a closing direction; detecting a point of time at which the stationary electrode tip contacted the workpiece; pressing the workpiece by contacting the movable electrode tip with the workpiece while the stationary electrode tip is held to the position at the point of time of the contact; and storing the position of the stationary electrode tip at the time of pressing as teaching data.

The speed of movement of the movable electrode tip relative to the workpiece becomes a value which is obtained by deducting the speed of movement of the gun main body, i.e., the stationary electrode tip from the speed of movement of the movable electrode tip relative to the gun main body. Therefore, according to the above-described second aspect of the present invention, the movable electrode tip does not move relative to the workpiece until the stationary electrode tip has come to a full stop by the contact thereof with the workpiece. The stationary electrode tip thus comes into contact with the workpiece ahead of the movable electrode tip.

In this manner, the stationary electrode tip contacts the workpiece in a state in which the deflection of the workpiece due to the electrode force from the movable electrode tip does not occur. In addition, since the stationary electrode tip is held to the position at the point of time of the contact thereof with the workpiece, there also does neither occur the deflection of the workpiece due to the electrode force from the stationary electrode tip. In this state, the movable electrode tip contacts the workpiece and the workpiece is pressed. Even if there is a clearance between the welded surfaces of the workpiece, the clearance is crushed by the pressing to the workpiece. At this time, the stationary electrode tip moves followed by the decrease in the clearance due to the movement of the gun main body by the pressing reaction force.

Therefore, the position of the stationary electrode tip at the time of pressing of the workpiece accurately represents the position of the workpiece in a state in which there is no deflection or clearance between the welded surfaces. By storing this position as the teaching data, the position of switching the speed of each of the electrode tips and the position of the spot welding gun can be adequately amended, whereby the welding of the workpiece can be performed well.

In order to detect the point of time of contact of the stationary electrode tip with the workpiece, it is preferable to set an upper limit value of a driving force of the driving source to such a value that the movement of the gun main body is restrained when the stationary electrode tip has slightly contacted the workpiece, to detect the speed of movement of the gun main body, and to detect a point of time at which the speed of movement of the gun main body has become zero as the point of time of the contact. Or else, it is preferable to detect a driving load of the driving source, and to detect a point of time at which the driving load has increased as the point of time of contact.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
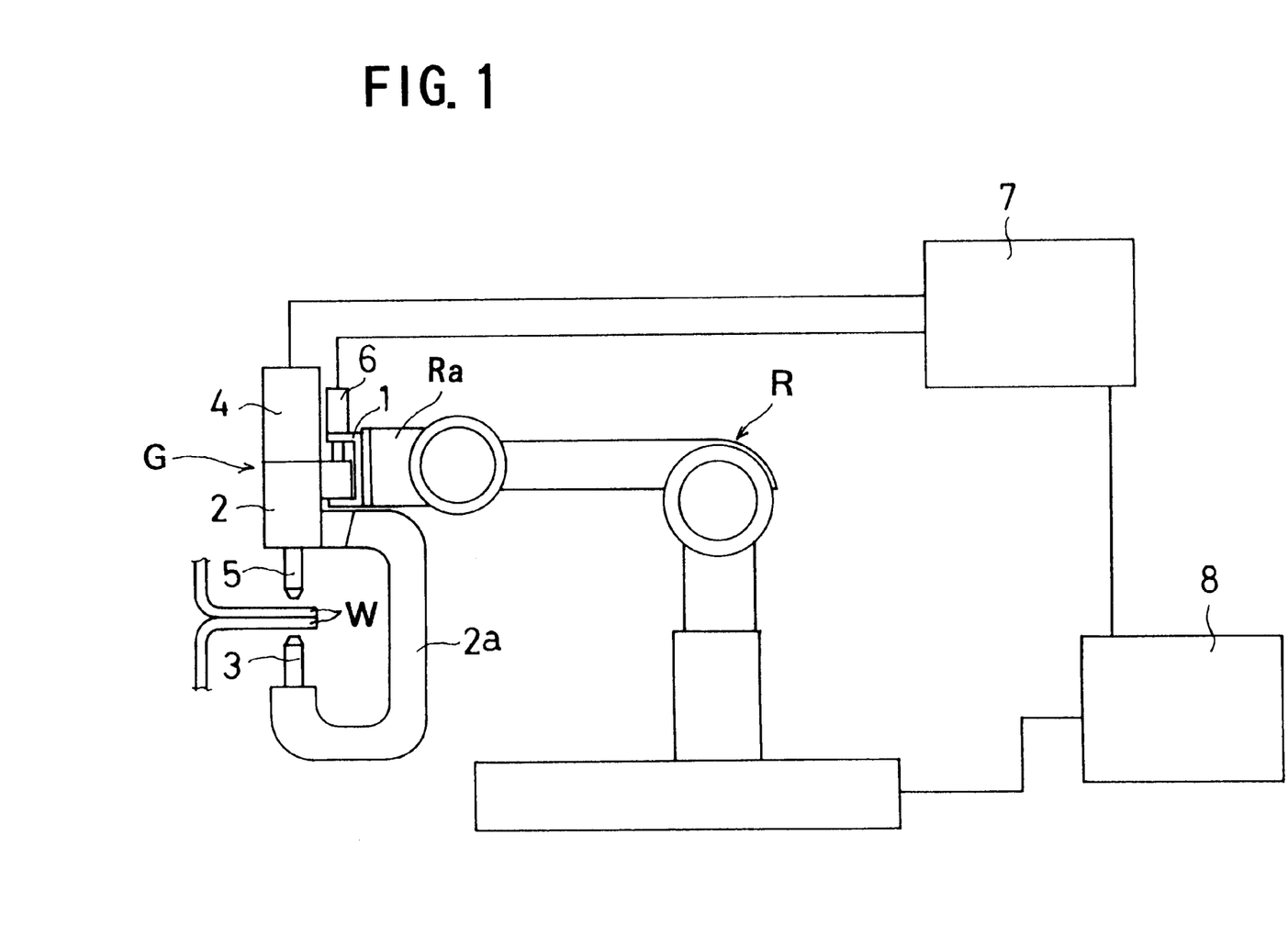
FIG. 1 is a side view of one example of a welding robot to which the present invention is applied.

With reference to FIG. 1, reference letter R denotes a welding robot. A welding gun G for spot welding (also called a spot welding gun G) is attached to a wrist portion R$a$ on an operating end of the robot R. The spot welding gun G is moved to each of the weld spot positions by the operation of the welding robot R to thereby perform welding of a workpiece W.

Figure 2:
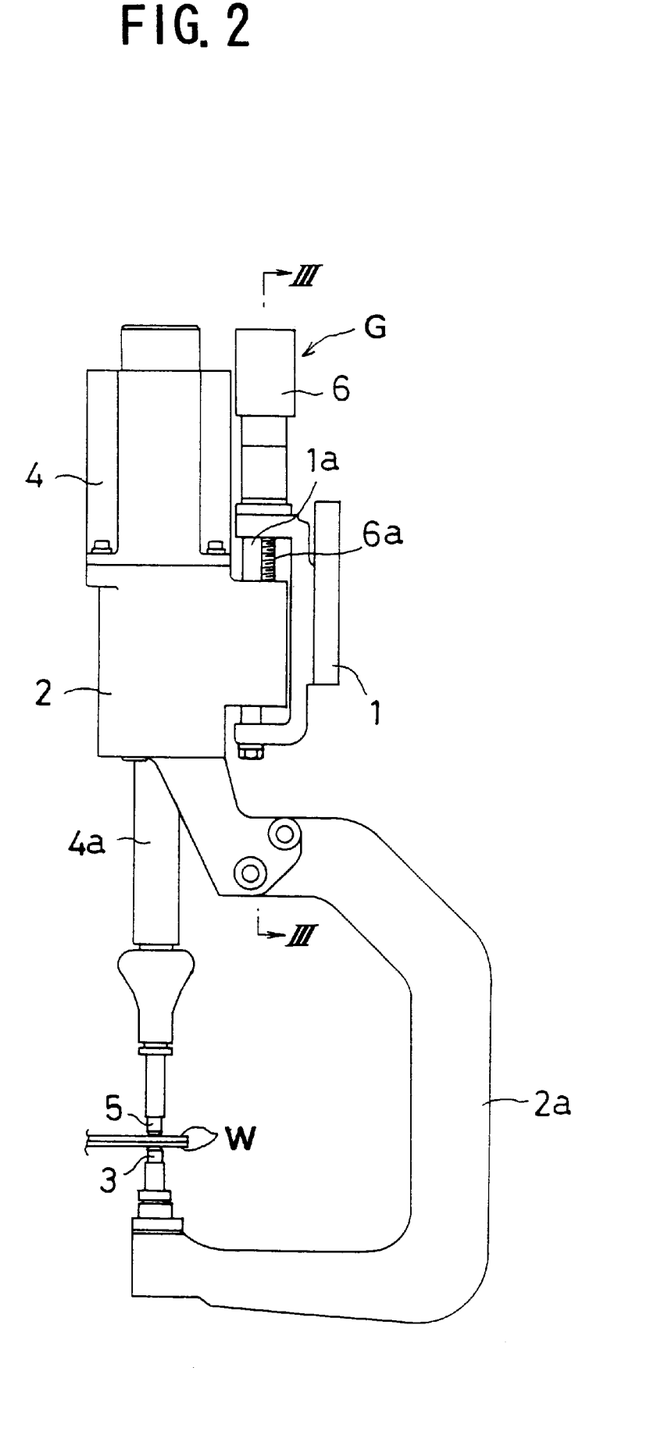
FIG. 2 is an enlarged side view of a spot welding gun which is attached to the welding robot of FIG. 1.

The spot welding gun G is provided, as shown in FIG. 2, with a gun main body 2 which is supported on a gun support bracket 1 so as to be movable vertically (i.e., up and down), the gun support bracket 1 being fixed to the wrist portion R$a$. The gun main body 2 is provided with a C-shaped yoke 2$a$ which is elongated downward. A lower electrode tip 3 which serves as a stationary electrode tip is attached to an end of lower portion of the C-shaped yoke 2$a$. On an upper end of the gun main body 2 there is mounted a pressing source 4 (i.e., a source for applying an electrode force) which is made up of a servomotor. A rod 4a which is moved up and down by the pressing source 4 via a ball screw (not illustrated) which is disposed inside the gun main body 2 is projected downward of the gun main body 2. To a lower end of the rod 4a there is attached an upper electrode tip 5, which serves as a movable electrode tip, in a manner to face (or lie opposite to) the lower electrode tip 3.

Figure 3:
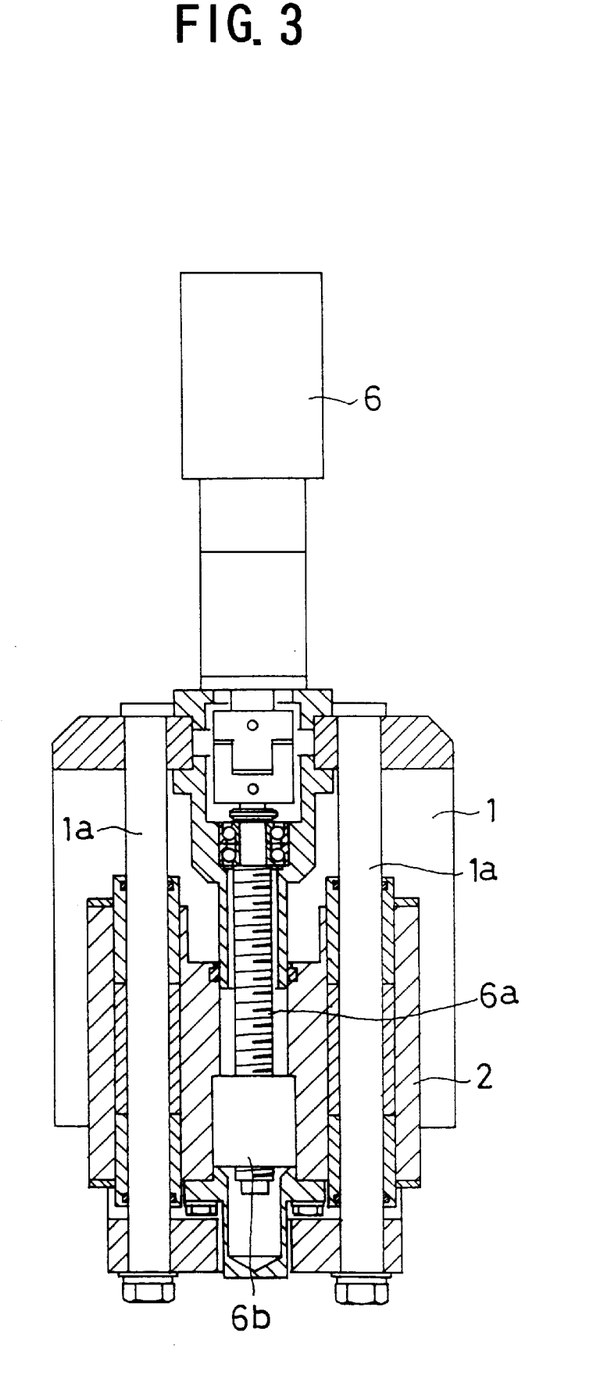
FIG. 3 is a cross-sectional view taken along the line III—III in FIG. 2.

The gun main body 2 is slidably supported, as shown in FIG. 3, by a pair of vertically elongated guide bars 1a which are fixed to the gun support bracket 1. On an upper end of the gun support bracket 1, there is mounted a driving source 6 which is made up of a servomotor. A vertically elongated ball screw 6a which is connected to the driving source 6 is inserted in a threaded (or screwed) manner through a nut 6b which is fixed to the gun main body 2. The gun main body 2 can thus be moved up and down by the driving source 6 via the ball screw mechanism. This ball screw mechanism is arranged such that the weight of the gun main body 2 operates on the ball screw 6a via the nut 6b as a reversing torque.

The pressing source 4 and the driving source 6 are controlled by a gun controller 7. When the spot welding gun G has reached a predetermined weld spot position of the workpiece W by the operation of the robot R, a pressing command (i.e., a command to apply an electrode force) from a robot controller 8 is received to thereby operate the pressing source 4 and the driving source 6, whereby the lower electrode tip 3 and the upper electrode tip 5 are closed from the respective open positions.

In the robot controller 8 there are stored teaching data which are required to move the spot welding gun G to each of the weld spot positions of the workpiece W. Explanations will be made hereinbelow about the teaching operation to obtain the teaching data.

At the time of teaching, the spot welding gun G is moved to each of the weld spot positions of the workpiece W by manually operating a teaching box (not illustrated). In each of the weld spot positions both the electrode tips 3, 5 of the spot welding gun G are closed to thereby pinch the workpiece W. When this pinching point has coincided with the required weld spot position of the workpiece W, the positional data of each axis of the welding robot R are stored as the teaching data corresponding to the weld spot position.

Figure 4:
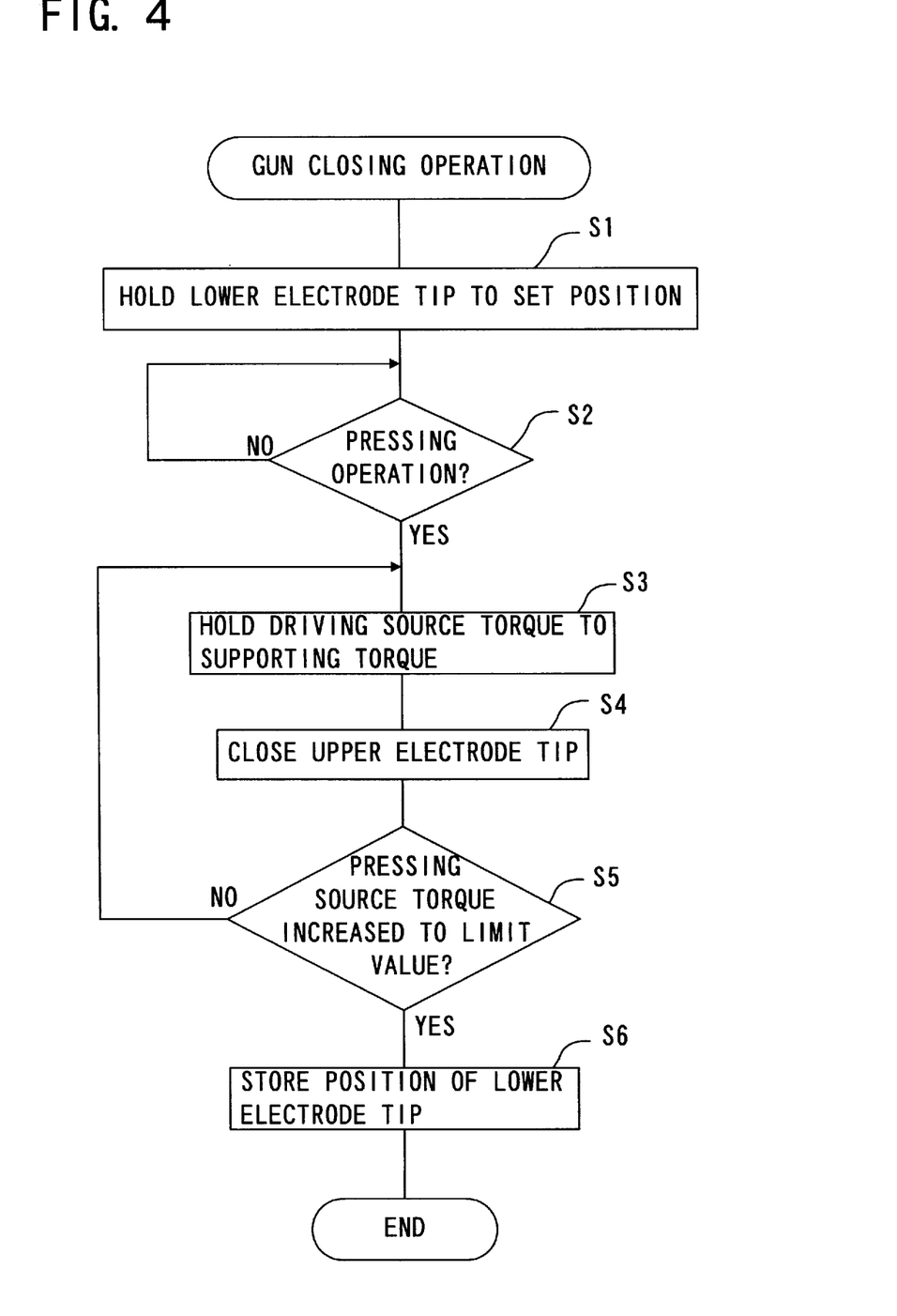
FIG. 4 is a flow chart showing one example of procedures of closing the spot welding gun at the time of teaching.

The closing operation of the spot welding gun G at the time of teaching is performed by the gun controller 7 according to the procedures shown in FIG. 4. Explanations are made about the details thereof.

First, the lower electrode tip 3 is moved to a predetermined set position by the driving source 6 via the gun main body 2 and is kept stationary therein (S1). When a button for pressing operation (i.e., a push button for applying an electrode force) in the teaching box is operated (S2), the driving force (torque) of the driving source 6 is switched and held to a value (supporting or sustaining torque TS) which is both necessary and sufficient to sustain (or support) the weight of the gun main body 2 (S3). In this state, the upper electrode tip 5 is moved from the open position in the direction of closing by the driving source 4, to thereby contact the upper electrode tip 5 with the workpiece W (S4).

In this case, until the upper electrode tip 5 comes into contact with the workpiece W, the driving source 6 is restrained by the balance between the reversing torque due to the weight of the gun main body 2 and the supporting torque TS. Therefore, the lower electrode tip 3 does not move from the set position. Once the upper electrode tip 5 has come into contact with the workpiece W, the reversing torque which operates on the driving source 6 becomes smaller than the supporting torque TS due to the contact reaction force, whereby the restraining of the driving source 6 is released. As a result, the gun main body 2, i.e., the lower electrode tip 3 moves upward by following to the movement of the upper electrode tip 5 relative to the gun main body 2 by means of the driving source 4. Then, when the lower electrode tip 3 has come into contact with the workpiece W, the workpiece W is pressed (i.e., an electrode force is applied to the workpiece W).

When the workpiece W has been pressed, the driving torque of the pressing source 4 increases due to an increase in the driving load. When this driving torque has increased to a predetermined limit value TL (5S), the present position of the lower electrode tip 3 is stored as teaching data which represent the vertical position of the workpiece W (S6). The position of the lower electrode tip 3 can be detected by the distance of movement of the lower electrode tip 3 (amount of rotation of the driving source 4) from the above-described predetermined set position. The above-described set position may be made as the open position of the lower electrode tip 3. However, since it takes time for the lower electrode tip 3 to come into contact with the workpiece W, it is preferable to make a position closer to the workpiece W, instead of the open position, as the set position.

Figures 5A, 5B:
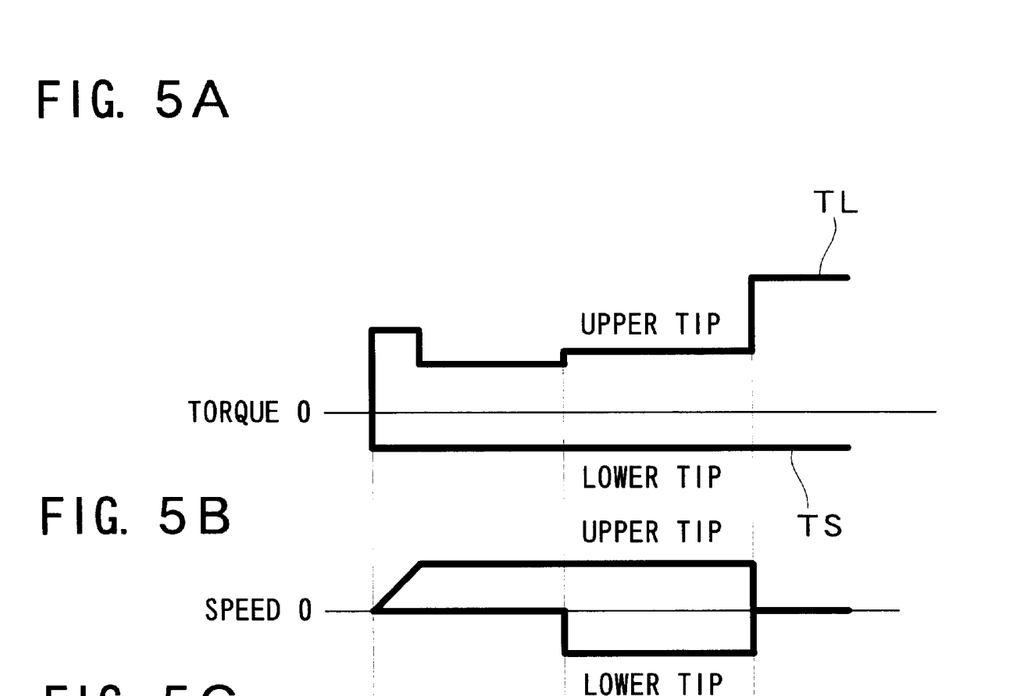
FIG. 5A is a graph sowing the change in torque of a pressing source and a driving source.
FIG. 5B is a graph showing the change in speed of each of the electrode tips, and FIG. C is a graph showing the change in position of each of the electrode tips.
Figure 5C:
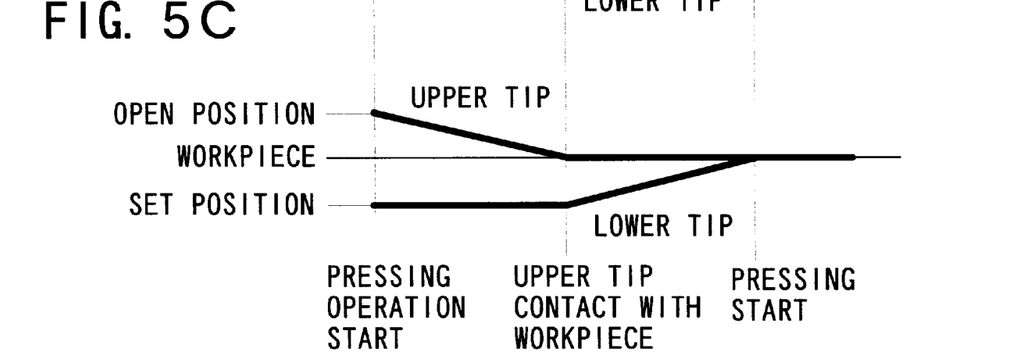

The changes in torque in the pressing source 4 and in the driving source 6, the changes in speed in each of the electrode tips 3, 5, as well as the changes in position in each of the electrode tips 3, 5 are shown in FIGS. 5A, 5B and 5C, respectively. The speed of movement of the upper electrode tip 5 is a relative speed of the upper electrode tip 5 relative to the gun main body 2.

If the workpiece W is pinched in the above-described operating procedures, that electrode force due to the weight of the gun main body 2 which operates on the workpiece W via the upper electrode tip 5 becomes substantially zero because the weight of the gun main body 2 is supported by the driving source 6. Therefore, the lower electrode tip 3 comes into contact with the workpiece W in a state in which the workpiece W is not deflected due to the electrode force from the upper electrode tip 5. It is, thus, possible to accurately detect the position in the vertical direction of the workpiece W based on the position of the lower electrode tip 3.

Figure 6:
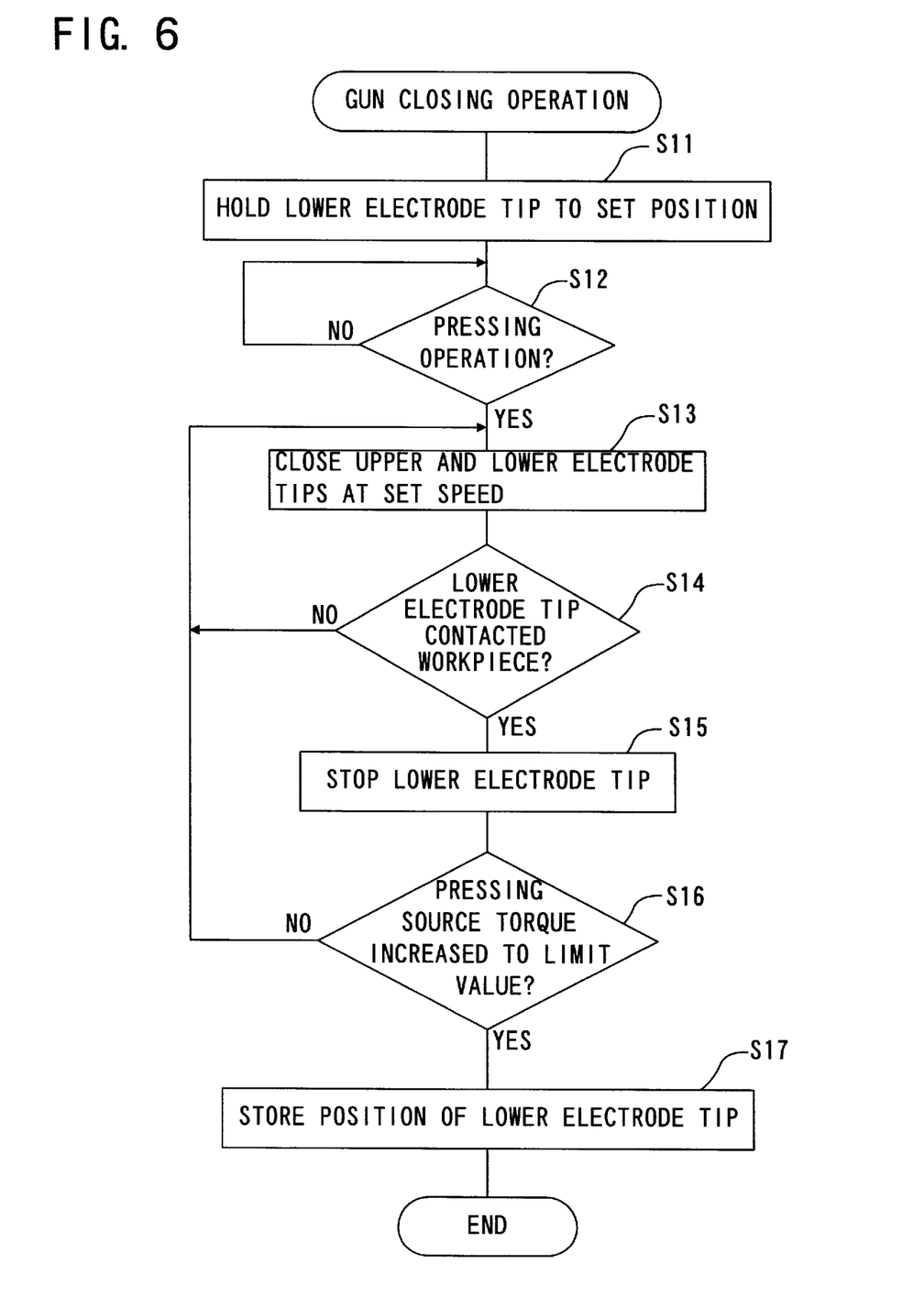
FIG. 6 is a flow chart showing another example of procedures of closing the spot welding gun at the time of teaching.

The closing operation of the spot welding gun G at the time of teaching can also be performed by the gun controller 7 by the procedures shown in FIG. 6. Details thereof are explained hereinbelow.

First, the lower electrode tip 3 is moved to a predetermined set position by the driving source 6 via the gun main body 2 and keeps it stationary at that position (S11). When the button for pressing operation in the teaching box has been operated (S12), the lower electrode tip 3 is moved up at the predetermined set speed VS from the set position by the upward movement of the gun main body 2 by means of the driving source 6 and, also, the upper electrode tip 5 is lowered by the driving source 4 relative to the gun main body 2 at a speed which is equal to the above-described set speed VS (S13). Then, when the lower electrode tip 3 has come into contact with the workpiece W (S14), the gun main body 2, i.e., the lower electrode tip 3 is stopped, and the lower electrode tip 3 is held to a position of contact with the workpiece W (S15). Although the above-described set position may be made as the open position of the lower electrode tip 3, it will, however, take time for the lower electrode tip 3 to come into contact with the workpiece W. Therefore, it is preferable to make a position closer to the workpiece W, rather than the open position, as the set position.

The point of time of contact of the lower electrode tip 3 with the workpiece W can be detected in the following manner. For example, an upper limit value of the driving force (torque) of the driving source 5 is set to such a value that the upward movement of the gun main body 2 is restrained when the stationary electrode tip 3 has slightly contacted the workpiece W (e.g., a contact pressure of 1 kgf). In other words, the value in question is one that is obtained by adding a slight or small torque to a value which is both necessary and sufficient to support the weight of the gun main body 2 (i.e., a supporting torque). The speed of the upward movement of the gun main body 2 is then detected. The point of time at which this speed has become zero can thus be detected as the point of time at which the lower electrode tip 3 has come into contact with the workpiece W.

Even if the upper limit value of the driving torque of the driving source 6 is not set as explained hereinabove, the point of time at which the lower electrode tip 3 has come into contact with the workpiece W can be detected by detecting the driving load (electric motor current) of the driving source 6. In other words, when the lower electrode tip 3 has come into contact with the workpiece W, the driving load increases. This point of time of increase can therefore be detected as the point of time of contact. In this case, after the detection of the contact, the driving torque is decreased to the above-described supporting torque. The lower electrode tip 3 is then stopped in a state in which the contact pressure of the lower electrode tip 3 with the workpiece W is substantially made to zero. Also in case the upper limit value of the driving torque of the driving source 6 is set as explained above, it is preferable to decrease the driving torque to the supporting torque after the detection of the contact.

Until the lower electrode tip 3 comes into contact with the workpiece W, the speed of downward movement of the upper electrode tip 5 relative to the gun main body 2 is equal to the speed of upward movement of the gun main body 2. Therefore, the upper electrode tip 5 remains stationary at the open position. When the lower electrode tip 3 has contacted the workpiece W, the upper electrode tip 5 moves downward at the set speed VS to thereby contact the workpiece W, whereby the workpiece W is pressed between both the electrode tips 3, 5. At this time, if there is a clearance between the welded surfaces of the workpiece W, the driving source 6 will be driven reversely by the contact reaction force of the upper electrode tip 3 with the workpiece W. As a result, the gun main body 2 moves up, and the lower electrode tip 3 moves up until there is no more clearance between the welded surfaces of the workpiece W.

Once the workpiece W is pressed as described above, the driving torque of the pressing source 4 increases with the increase in the driving load. When the driving torque has increased to a predetermined limit value (S16), the present position of the lower electrode tip 3 is stored as the teaching data which represent the vertical position of the workpiece W (S17). The position of the lower electrode tip 3 can be detected by the distance of movement of the lower electrode tip 3 (the amount of rotation of the driving source 6) from the above-described set position.

Figure 7A:
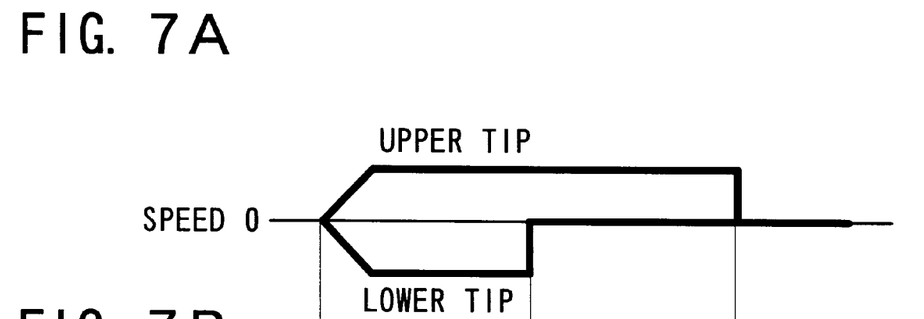
FIG. 7A is a graph showing the change in speed of each of the electrode tips.
Figure 7B:
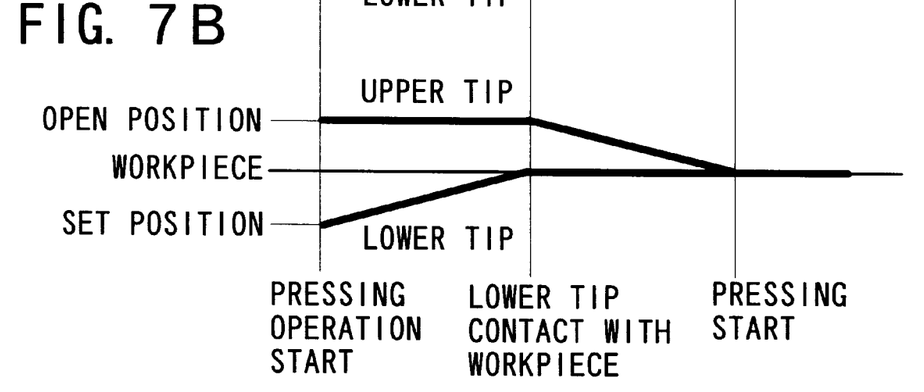
FIG. 7B is a graph showing the change in position of each of the electrode tips.

The changes in speed of each of the electrode tips 3, 5 as well as the changes in position in each of the electrode tips 3, 5 are shown in FIGS. 7A and 7B. The speed of movement of the upper electrode tip 5 is a relative speed of the upper electrode tip 5 relative to the gun main body 2.

When the closing operations have been performed as described above, the lower electrode tip 3 comes into contact with the workpiece W ahead of the upper electrode tip 5 and is held to the position at the point of time of contact. Therefore, the workpiece W will not be deflected by the electrode force from the upper electrode tip 5 or by the electrode force from the lower electrode tip 3. Further, even if there is a clearance between the welded surfaces of the workpiece W, the lower electrode tip 3 will move until there is no more clearance at the time of pressing the workpiece W. The position of the lower electrode tip 3 at the time of pressing the workpiece W will, thus, coincide with the position of the workpiece W in a state in which there is neither deflection nor clearance between the welded surfaces. Therefore, the position of the workpiece W in the vertical direction can be accurately detected from the position of the lower electrode tip 3.

Once the welding gun G has been closed in the procedures shown in FIG. 4 or FIG. 6, and the positional data of the lower electrode tip 3 have been stored as the teaching data, there is set, based on the positional data as the reference position of the workpiece, a landing start position of each of the electrode tips 3, 5 which are off by a predetermined distance from the workpiece W. When the welding robot is operated, each of the electrode tips 3, 5 is moved at a relatively high speed from the respective open positions to the landing start positions, thereby shortening the time required for the closing operation. Each of the electrode tips 3, 5 is then moved at a relatively low speed from the landing start position, thereby preventing the striking against the workpiece by the striking of the electrode tips. Even if the position of the workpiece W deviates in the vertical direction relative to the spot welding gun G due to an error in setting of the workpiece or to an error in the positioning of the robot, the deformation of the workpiece by the striking of the electrode tips can be prevented if the landing start positions of both the electrode tips 3, 5 are set so that the workpiece lies therebetween.

Further, the landing start positions of both the electrode tips 3, 5 may be set based on the center of opening and closing of both the electrode tips 3, 5 and, based on the positional data of the lower electrode tip 3, the vertical position of the spot welding gun G may be amended so that the center of opening and closing coincides with the position of the workpiece.

In the above-described embodiments, the pressing source 4 and the driving source 6 are constituted by servomotors. The present invention can also be applied to an example in which they are constituted by servo-cylinders.

It is readily apparent that the above-described method of teaching a welding robot meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of teaching a welding robot, said welding robot comprising a spot welding gun which is mounted via a gun support bracket on an operating end of said welding robot, said spot welding gun comprising:

a gun main body;

a stationary electrode tip which is mounted on said gun main body so as to be immovable relative thereto;

a movable electrode tip which is mounted on said gun main body and is operated to open and close by a pressing source, said gun main body being movable by a driving source relative to said gun support bracket in a direction in which both said electrode tips lie opposite to each other, said method comprising the steps of:

in teaching said spot welding gun by the movement thereof to each weld spot position of a workpiece, moving said movable electrode tip at said each weld spot position in a closing direction relative to said gun main body by said pressing source in a state in which said gun main body is kept stationary at a predetermined position relative to said gun support bracket, and moving said stationary electrode tip in a closing direction by a relative movement of said gun main body relative to said movable electrode tip after the movable electrode tip has come into contact with the workpiece;

detecting a position at which said stationary electrode tip contacted the workpiece; and storing said position as teaching data.

2. A method of teaching a welding robot according to claim 1, wherein, when said movable electrode tip is moved in the closing direction relative to said gun main body, a driving force of said driving source is held to a value which is both necessary and sufficient to support a weight of said gun main body.

3. A method of teaching a welding robot, said welding robot comprising a spot welding gun which is mounted via a gun support bracket on an operating end of said welding robot, said spot welding gun comprising:

a gun main body;

a stationary electrode tip which is mounted on said gun main body so as to be immovable relative thereto;

a movable electrode tip which is mounted on said gun main body and is operated to open and close by a pressing source, said gun main body being movable by a driving source relative to said gun support bracket in a direction in which both said electrode tips lie opposite to each other, said method comprising the steps of:

in teaching said spot welding gun by the movement thereof to each weld spot position of a workpiece, moving said stationary electrode tip at said each weld position, at a predetermined set speed, through movement of said gun main body by means of said driving source in a closing direction in which said stationary electrode tip approaches the workpiece, and moving said movable electrode tip, at a relative speed which is equal to said set speed, relative to said gun main body by said pressing source in a closing direction;

detecting a point of time at which said stationary electrode tip contacted the workpiece;

pressing the workpiece by contacting said movable electrode tip with the workpiece while said stationary electrode tip is held to the position at the point of time of said contact; and storing the position of said stationary electrode tip at the time of pressing as teaching data.

4. A method of teaching a welding robot according to claim 3, further comprising the steps of:

when said stationary electrode tip is moved to the closing direction, setting an upper limit value of a driving force of said driving source to such a value that the movement of said gun main body is restrained when said stationary electrode tip has slightly contacted the workpiece;

detecting the speed of movement of said gun main body; and detecting a point of time at which said speed of movement of said gun main body has become zero as said point of time of said contact.

5. A method of teaching a welding robot according to claim 3, further comprising the steps of:

when said stationary electrode tip is moved in the closing direction, detecting a driving load of said driving source; and detecting a point of time at which said driving load has increased as said point of time of contact.

* * * * *